United States Patent
Tsao (10) Patent No.: US 9,003,213 B2
(45) Date of Patent: Apr. 7, 2015

(54) BATTERY DISCHARGING METHOD

(75) Inventor: Yu-Wei Tsao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 226 days.

(21) Appl. No.: 13/598,612

(22) Filed: Aug. 29, 2012

(65) Prior Publication Data

US 2013/0205147 A1 Aug. 8, 2013

(30) Foreign Application Priority Data

Feb. 2, 2012 (TW) .............................. 101103345 A (51) Int. Cl.
*G06F 1/32* (2006.01)
*G06F 1/00* (2006.01)
*H02J 7/00* (2006.01)
*H01M 10/44* (2006.01)

(52) U.S. Cl.
CPC .............. *H01M 10/44* (2013.01); *G06F 1/324* (2013.01)

(58) Field of Classification Search
CPC ....... H01M 10/44; G06F 1/3212; G06F 1/324
USPC .................................. 713/320, 322; 320/127
See application file for complete search history.

(56) References Cited

U.S. PATENT DOCUMENTS

| | | | |
|---|---|---|---|
| 5,230,056 A * | 7/1993 | Hoshina | 713/340 |
| 7,069,463 B2 * | 6/2006 | Oh | 713/503 |
| 7,594,132 B2 * | 9/2009 | Kim | 713/322 |
| 8,645,088 B2 * | 2/2014 | Schaefer et al. | 702/63 |
| 2002/0108070 A1 | 8/2002 | Oh | |
| 2003/0204762 A1 | 10/2003 | Lee | |
| 2006/0026447 A1 | 2/2006 | Naveh | |
| 2013/0124892 A1 * | 5/2013 | Lu et al. | 713/322 |

FOREIGN PATENT DOCUMENTS

| | | |
|---|---|---|
| CN | 102193615 A | 9/2011 |
| TW | 200625069 | 7/2006 |
| TW | I262380 | 9/2006 |

OTHER PUBLICATIONS

Office action mailed on Aug. 4, 2014 for the Taiwan application No. 101103345, filing date: Feb. 2, 2012, p. 1 line 1-14, p. 2-4 and p. 5 line 1-6.
Office action mailed on Nov. 25, 2014 for the China application No. 201210031488.5, p. 3-4 and p. 5 line 1-2.

* cited by examiner

*Primary Examiner* — Stefan Stoynov
(74) *Attorney, Agent, or Firm* — Winston Hsu; Scott Margo (57) ABSTRACT

A battery discharging method for a computer system is disclosed. The battery discharging method is to detect a first detection value relative to a first status of a battery of the computer system and a second detection value relative to a second status of the battery, then to determine a clock adjustment parameter according to the first detection value and the second detection value, and at last to adjust an operation clock rate of a processor of the computer system according to the clock adjustment parameter. Therein, the statuses of the battery can be discharging temperature, discharging current, discharging voltage, residual capacity, or other statuses of the battery. Therefore, the invention can adjust the operation clock rate of the processor under the consideration to the statuses of the battery, so as to extend the discharging period of the battery and utilize the stored energy in the battery efficiently.

30 Claims, 7 Drawing Sheets

BATTERY DISCHARGING METHOD

BACKGROUND OF THE INVENTION

1. Field of the Invention

The invention relates to a battery discharging method, and especially relates to a battery discharging method for a battery of a computer system.

2. Description of the Prior Art

Portable electronic apparatus such as smart phone, tablet computer, or notebook is equipped with an internal power source inside to be suitable for operating anytime. The internal power source is commonly realized by a battery. However, the stored energy in the battery is limited, so how to utilize the stored energy in the battery efficiently is a key challenge. A simpler method is to reduce unnecessary consumption of energy. For example, when a system is idle for a period of time, turning off some devices (such as monitor) without immediate use or stopping some applications can reduce energy consumption. This method is based on the status of the system, not the status of the battery itself. When the stored energy in the battery is very insufficient, if the system still operates at high speed, it is very possible to consume the stored energy out in a short time, even to unexpectedly shut down the system leading to data loss and damage to software and hardware. Furthermore, the battery has particular charging and recharging characteristic. In general, the most stored energy in the battery decreases for a period of time of use, leading to the inconformity of the labeled capability of stored energy in the battery of the system with the actual capability of stored energy in the battery. If the system still operates at high speed when the actual stored energy is almost insufficient, a user cannot be informed of the actual capability correctly so as to worsen the above problem. At present, a method of monitoring the stored energy in the battery for adjusting the throttle rate of the system clock is applied. This method can reduce the consumption of the stored energy in the battery, but the system still operates at high speed. Any high speed system consumes energy in a certain degree. When the stored energy is insufficient or the actual capability much differs from the predicted capability, the system security is still under the risk.

SUMMARY OF THE INVENTION

An objective of the invention is to provide a battery discharging method, which adjusts an operation clock rate according to a plurality of statuses relative a battery, so as to reduce energy consumption and extend charging time.

The battery discharging method of the invention is used in a computer system. The computer system includes a processor and a battery for powering the processor. The battery discharging method is to detect a first detection value relative to a first status of the battery and a second detection value relative to a second status of the battery; to determine a clock adjustment parameter according to the first detection value and the second detection value; and at last, to adjust an operation clock rate of the processor according to the clock adjustment parameter. In practice, the first status and the second status are two selected from the group consisting of discharging temperature, discharging current, discharging voltage, and residual capacity. Therefore, the invention monitors the plurality of statuses of the battery to reflect the actual condition of the battery more than the prior art, so that the battery can be discharged in a proper discharging condition so as to extend the discharging time of the battery and utilize the stored energy in the battery efficiently. Furthermore, in a common use condition, when the capability of the stored energy in the battery decreases gradually, the battery discharging method is to implement an underclocking operation on the processor. The underclocking can reduce the consumption rate of the stored energy; the system operating at a lower clock is conducive to improvement of usage efficiency of the stored energy as well.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
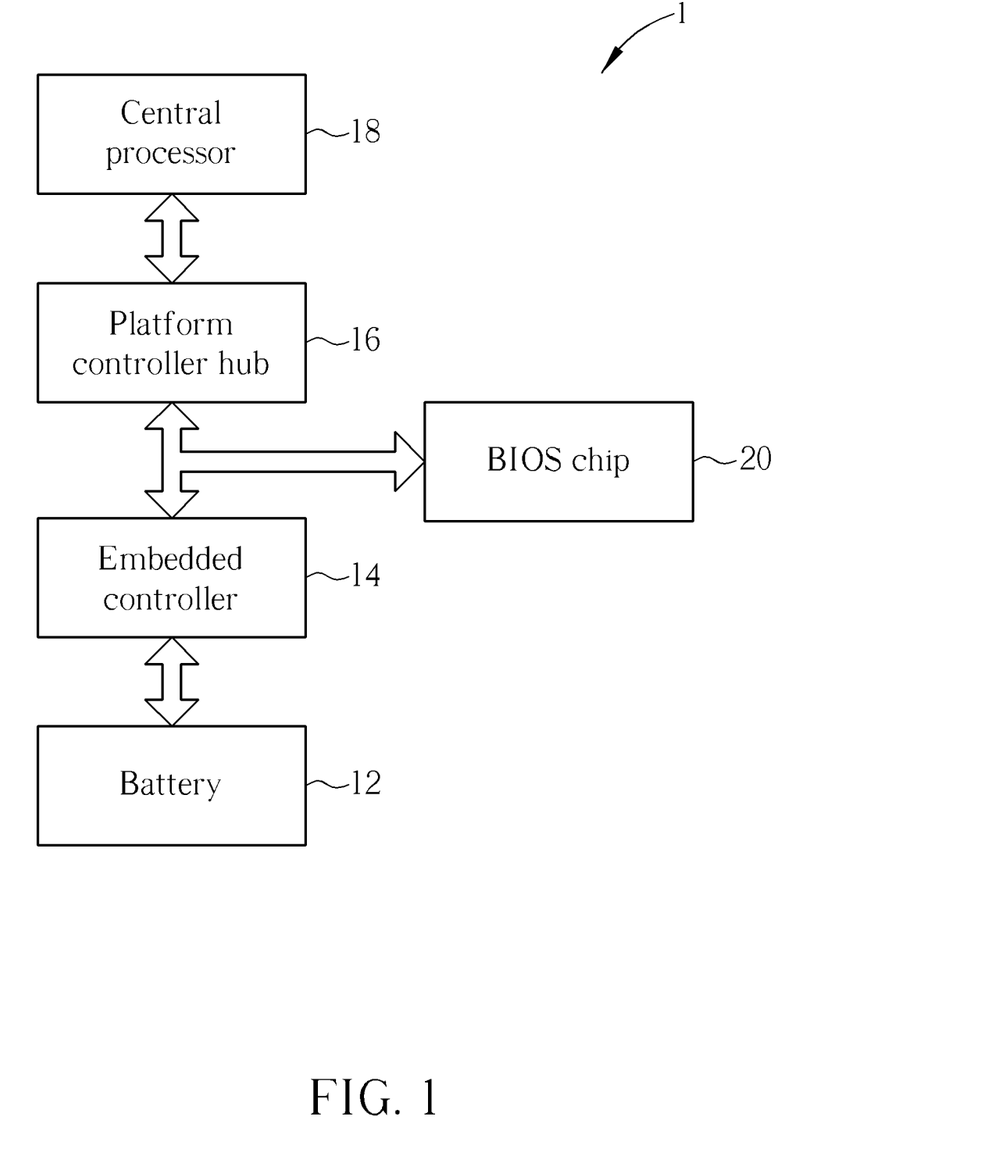
FIG. 1 is a function block diagram illustrating a computer system of a preferred embodiment according to the invention.
Figure 2:
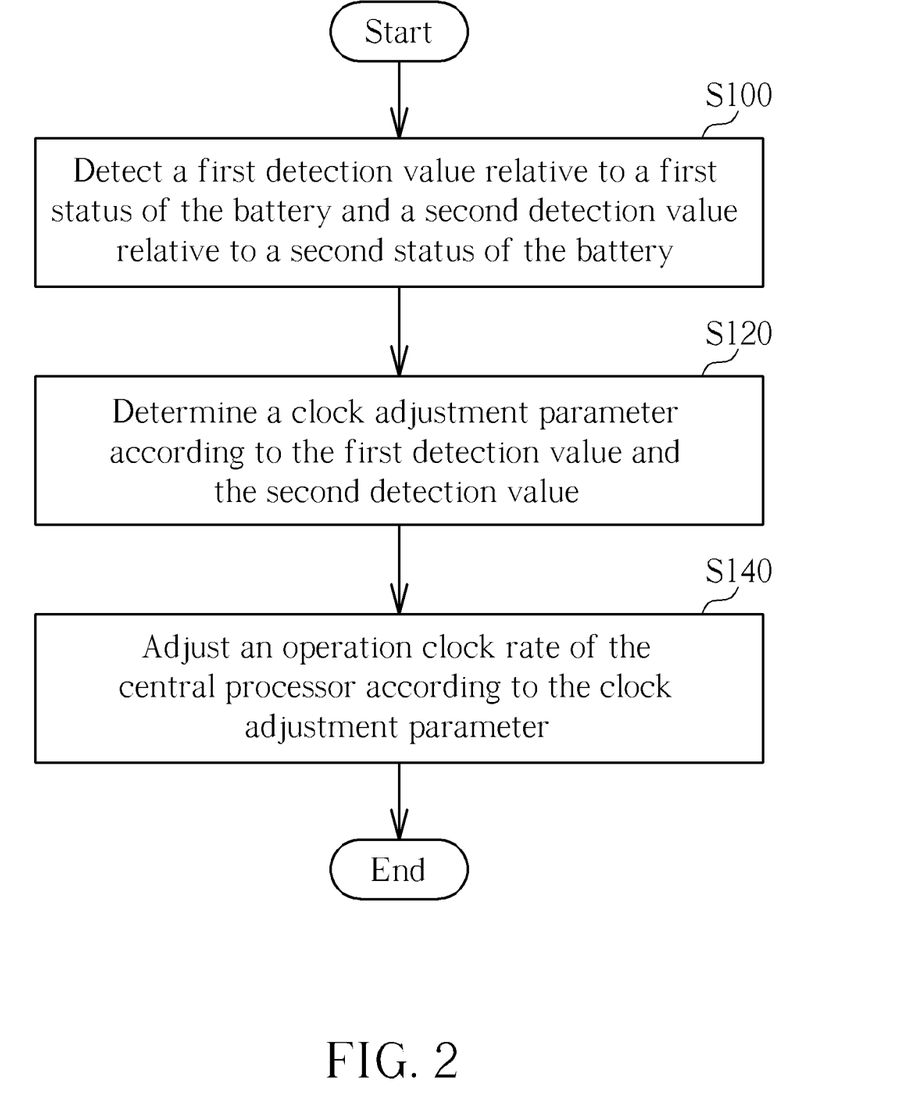
FIG. 2 is a main flow chart of a battery discharging method according to the preferred embodiment.

Please refer to FIG. 1 and FIG. 2. FIG. 1 is a function block diagram illustrating a computer system 1 of a preferred embodiment according to the invention. FIG. 2 is a main flow chart of a battery discharging method according to the preferred embodiment. In the embodiment, the computer system 1 includes a battery 12, an embedded controller 14, a platform controller hub 16, a central processor 18, and a basic input/output system (BIOS) chip 20. The battery 12 is electrically connected to the embedded controller 14 by a system management bus. The embedded controller 14, the platform controller hub 16, and the BIOS chip 20 are electrically connected by a low pin count bus. The platform controller hub 16 and the central processor 18 are linked by a flexible display interface (FDI) and a direct media interface (DMI). In the embodiment, the battery discharging method is performed mainly inside the embedded controller 14. By controlling the operation clock rate of the central processor 18, the battery discharging method is to reduce the consumption of the stored energy in the battery 12 and to extend the discharging time of the battery 12, so as to utilize the stored energy in the battery 12 efficiently.

Please refer to FIG. 2. In general, the battery discharging method is to detect a first detection value relative to a first status of the battery 12 and a second detection value relative to a second status of the battery 12 in advance, as shown by the step S100. The first status and the second status are different and can respectively be discharging temperature, discharging current, discharging voltage, residual capacity, or other status relative to discharging of the battery 12. The battery discharging method is then to determine a clock adjustment parameter according to the first detection value and the second detection value, as shown by the step S120; to adjust the operation clock rate of the central processor 18 according to the clock adjustment parameter, as shown by the step S140. Therefore, compared with the prior art, the battery discharging method monitors a plurality of status of the battery 12 at the same time, so as to reflect the discharging status of the battery 12 precisely for efficiently utilizing the stored energy in the battery 12 efficiently.

Figure 3:
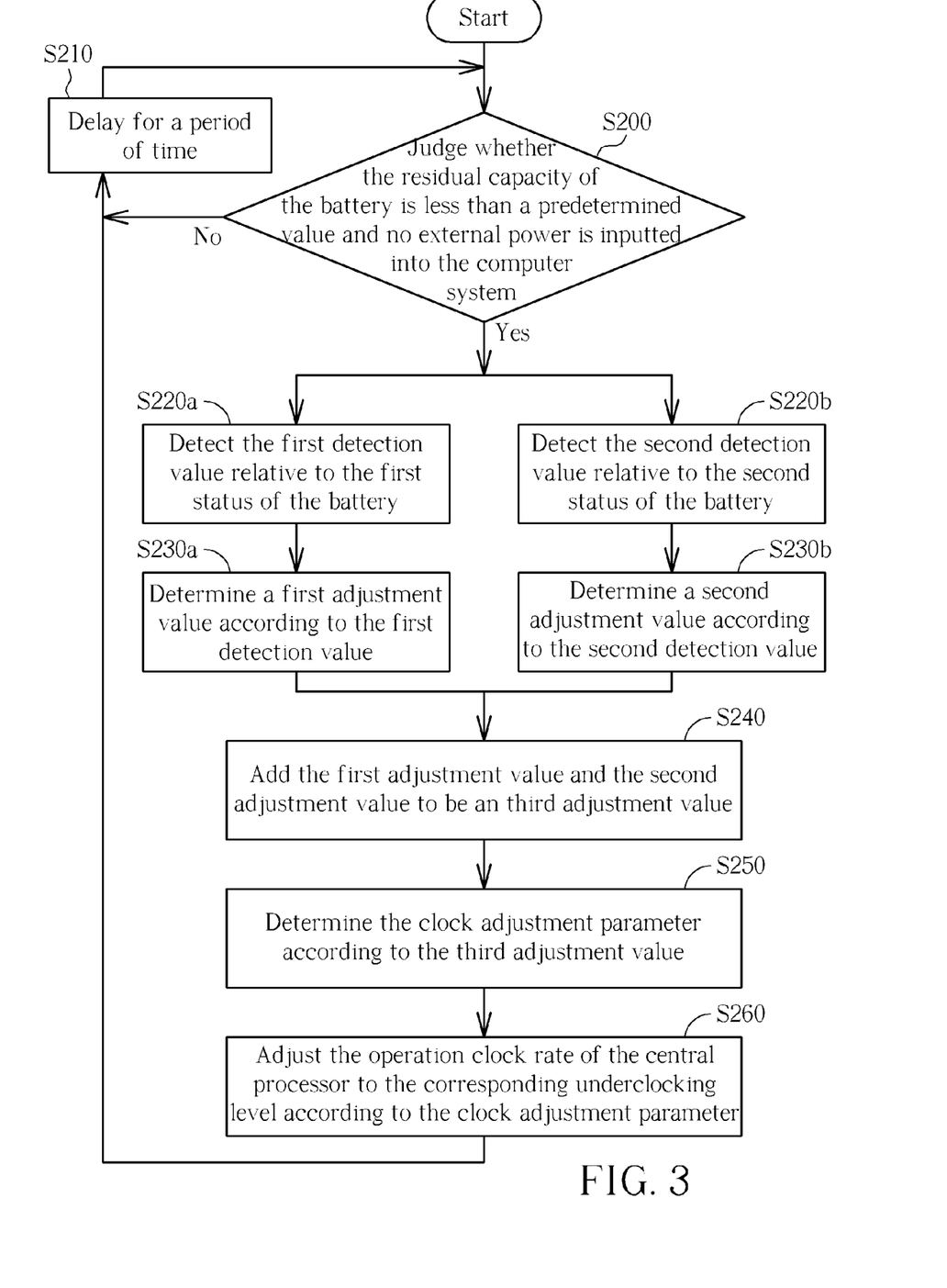
FIG. 3 is a detailed flow chart of the battery discharging method according to the preferred embodiment.

Please refer to FIG. 3, which is a detailed flow chart of the battery discharging method according to the preferred embodiment. The starting of the battery discharging method can be triggered by user or activated as daemon at the initialization of the system; however, the invention is not limited thereto. After enabled, the battery discharging method is to detect the residual capacity of the battery 12 and existence of any external power after and then to judge whether the residual capacity of the battery 12 is less than a predetermined value and no external power is inputted into the computer system, as shown by the step S200. In general, the predetermined value can be 50% and be capable of being post-modified by user.

If in the step S200, the result of the judging is false, the battery discharging method is to delay for a period of time, as shown by the step S210. Afterward, please back to the step S200. In general, the delay time can be 200 ms; however, the invention is not limited thereto. In principle, the delay time can be determined for any purpose as long as the determining does not interrupt other routines by the embedded controller 14 excessively. If in the step S200, the result of the judging is true, the battery discharging method is to detect the first detection value relative to the first status of the battery 12, as shown by the step S220a, and also to detect the second detection value relative to the second status of the battery 12, as shown by the step S220b. In the embodiment, the first status is residual capacity, and the first detection value is recorded in percentage; however, the invention is not limited thereto. The second status is discharging current, and the second detection value is recorded in capacity current (C); however, the invention is not limited thereto. Therein, the first detection value is known in the detection in the step S200, so the step S220a can be omitted in practice.

Figure 4:
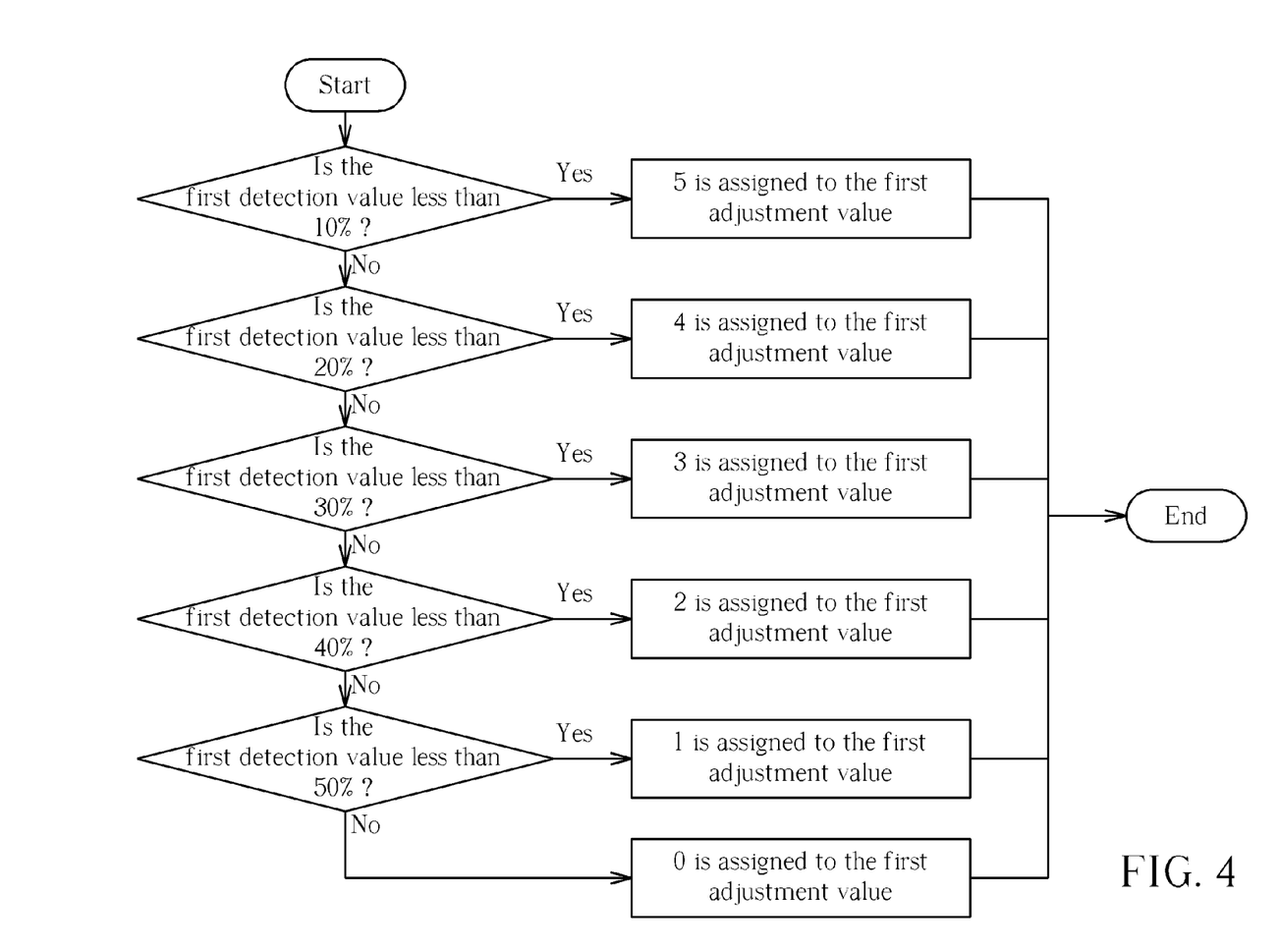
FIG. 4 is an assignment flow chart of a first adjustment value in FIG. 3.

In the embodiment, the battery discharging method is based on a multi-level adjustment, so the battery discharging method is to group the first detection value and the second detection value. After the step S220a is completed, the battery discharging method is to determine a first adjustment value according to the first detection value, as shown by the step S230a. Logically, according to a plurality of detection value ranges relative to the first status and a plurality of adjustment reference values corresponding to the detection value ranges, the battery discharging method is to determine one detection value range containing the first detection value. It can be implemented by a look-up table. Afterward, the battery discharging method is to assign the adjustment reference value corresponding to the determined detection value range to the first adjustment value. In practice, the step S230a can be implemented by a series of judgment procedures, as shown in FIG. 4; however, the invention is not limited thereto. As shown in FIG. 4, the residual capacity is grouped into six groups, i.e. six detection value ranges—larger than 50%, from 40% to 50%, from 30% to 40%, from 20% to 30%, from 10% to 20%, and less than 10%, which correspond to the adjustment reference values in integer from 0 to 5 respectively.

Therefore, if the first detection value is less than 10%, the adjustment reference value of 5 is assigned to the first adjustment value. If the first detection value is larger than 10% but less than 20%, the adjustment reference value of 4 is assigned to the first adjustment value. If the first detection value is larger than 20% but less than 30%, the adjustment reference value of 3 is assigned to the first adjustment value. If the first detection value is larger than 30% but less than 40%, the adjustment reference value of 2 is assigned to the first adjustment value. If the first detection value is larger than 40% but less than 50%, the adjustment reference value of 1 is assigned to the first adjustment value. If the first detection value is larger than 50%, the adjustment reference value of 0 is assigned to the first adjustment value. It is added that in principle, when the first detection value is larger than 50%, the battery discharging method is to determine the iteration is ended in the step S200, and the procedure of assigning 0 to the first adjustment value is not executed, so the residual capacity can be regarded as being grouped in five groups actually. In addition, the quantity of the groups for the residual capacity depends on a design specification for a practical product, but the invention is not limited thereto.

Figure 5:
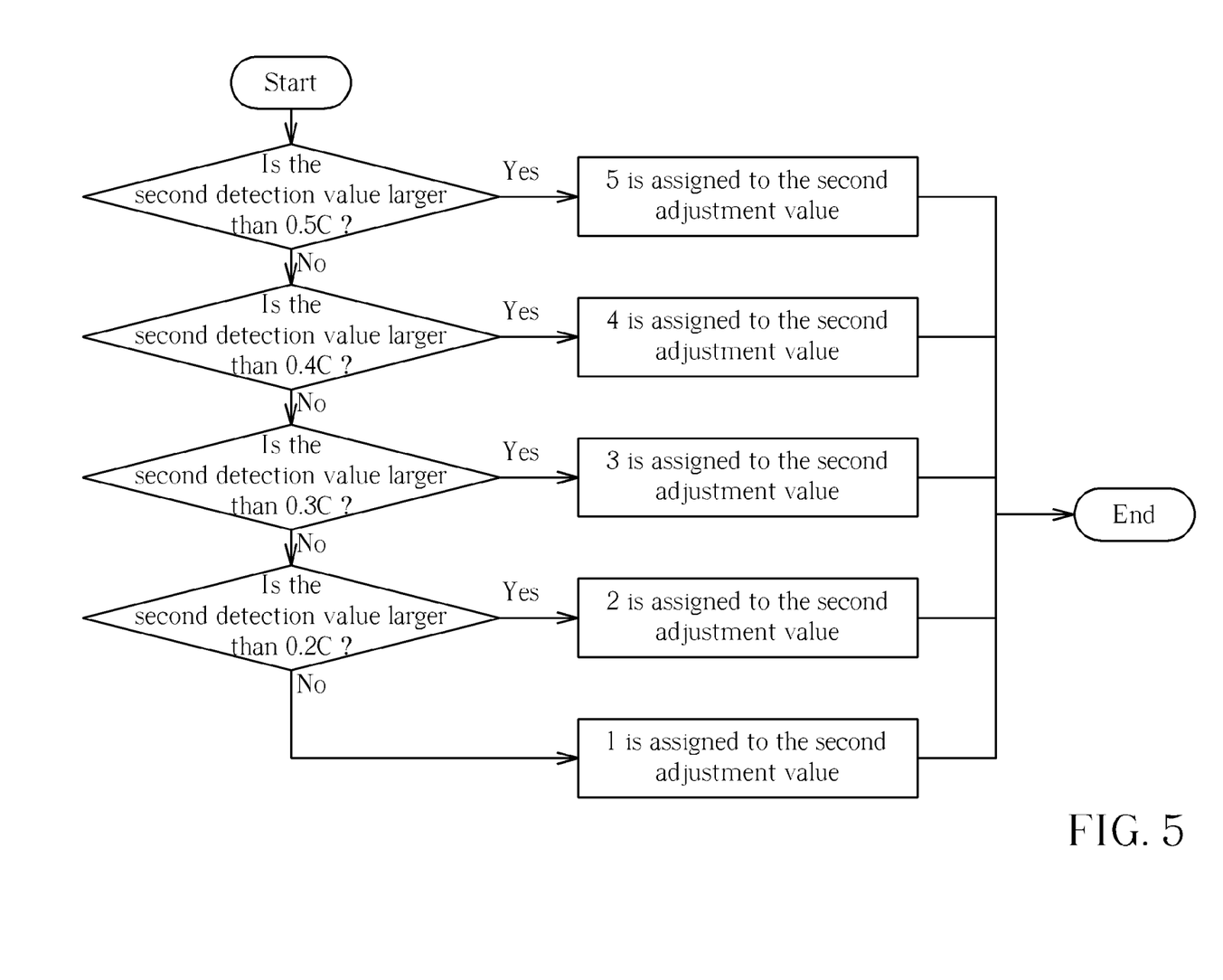
FIG. 5 is an assignment flow chart of a second adjustment value in FIG. 3.

Similarly, after the step S220b is completed, the battery discharging method is to determine a second adjustment value according to the second detection value, as shown by the step S230b. Logically, according to a plurality of detection value ranges relative to the second status and a plurality of adjustment reference values corresponding to the detection value ranges, the battery discharging method is to determine one detection value range containing the second detection value. Afterward, the battery discharging method is to assign the adjustment reference value corresponding to the determined detection value range to the second adjustment value. Similarly, in practice, the step S230b can be implemented by a series of judgment procedures, as shown in FIG. 5; however, the invention is not limited thereto. As shown in FIG. 5, the discharging current is grouped into five groups, i.e. five detection value ranges—larger than 0.5 C, from 0.4 C to 0.5 C, from 0.3 C to 0.4 C, from 0.2 C to 0.3 C, and less than 0.2 C, which correspond to the adjustment reference values in integer from 1 to 5 respectively.

Therefore, if the second detection value is larger than 0.5 C, the adjustment reference value of 5 is assigned to the second adjustment value. If the second detection value is larger than 0.4 C but less than 0.5 C, the adjustment reference value of 4 is assigned to the second adjustment value. If the second detection value is larger than 0.3 C but less than 0.4 C, the adjustment reference value of 3 is assigned to the second adjustment value. If the second detection value is larger than 0.2 C but less than 0.3 C, the adjustment reference value of 2 is assigned to the second adjustment value. If the second detection value is less than 0.2 C, the adjustment reference value of 1 is assigned to the second adjustment value. In general, in the embodiment, the discharging current is grouped into five groups, and the quantity of the groups for the discharging current depends on a design specification for a practical product, but the invention is not limited thereto.

Please back to FIG. 3. Afterward, the battery discharging method is to add the first adjustment value and the second adjustment value to be an third adjustment value, as shown by the step S240. The battery discharging method is then to determine the clock adjustment parameter according to the third adjustment value, as shown by the step S250. Logically, in the step S250, according to a plurality of adjustment comparison values and a plurality of adjustment reference parameters corresponding to the adjustment comparison values, the battery discharging method is to determine one adjustment comparison value matching the third adjustment value. It can be implemented by a look-up table. Afterward, the battery discharging method is to assign the adjustment reference parameter corresponding to the determined adjustment comparison value to the clock adjustment parameter. In a design for the look-up table, the adjustment comparison values can be determined so as to contain all possible third adjustment values, or a ceiling value for the third adjustment value is determined in the step S240 so as to limit the possible value range of third adjustment values. For example, if the third adjustment value is larger than a predetermined value, the battery discharging method is to assign the predetermined value to the third adjustment value. In general, enough stored energy is a prerequisite for battery discharging, so in the embodiment, when the residual capacity of the battery 12 is less than a certain capacity, it is proper to assign the ceiling value (i.e. the predetermined value) to the first adjustment value. For example, when the first detection value is less than 10%, the battery discharging method is to assign the ceiling value to the first adjustment value, so as to ensure that the third adjustment value is equal to the ceiling value so that the operation clock rate of the central processor 18 can be adjusted most for controlling the discharging of the battery 12 efficiently.

In practice, the clock adjustment parameter can be an underclocking percentage of a current clock rate or correspond to one of underclocking levels. The underclocking levels can be percentages of a clock rate at full-speed; however, the invention is not limited thereto. For example, the clock adjustment parameter can be determined to be a target clock rate directly. In the embodiment, the battery discharging method is to adjust the operation clock rate of the central processor 18 to the corresponding underclocking level according to the clock adjustment parameter, as shown by the step S260. In principle, the larger the third adjustment value is determined, the more the operation clock rate based on the underclocking level corresponding to the clock adjustment parameter is adjusted down. It is added that the invention is illustrated by underclocking in the above embodiment show, but under some condition, the invention also can effect a clock increasing. For example, the battery 12 is charged in a period of time during the operation of the computer system 1 and the external power is turned off. The discharging condition for the battery 12 is therefore improved. When the battery discharging method is activated again, a smaller third adjustment value can be obtained. If the computer system 1 did not operate at full speed during the above charging period, the battery discharging method is to relatively increase the operation clock rate. After the step S260 is completed, the battery discharging method is back to the step S210, delays for a period of time, and is back to the step S200 for a next iteration.

Figure 6A:
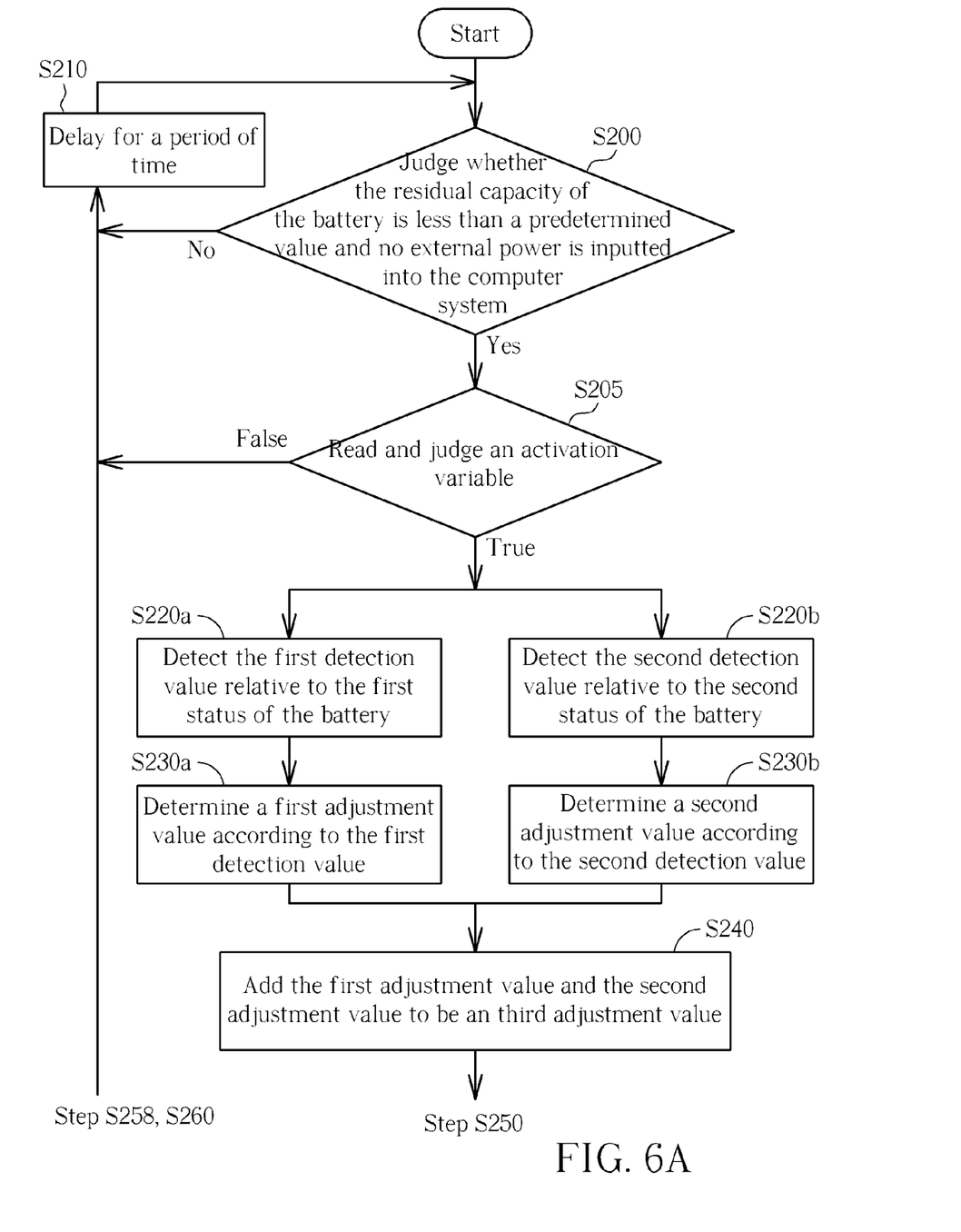
FIG. 6A and FIG. 6B are a detailed flow chart of the battery discharging method according to an embodiment.
Figure 6B:
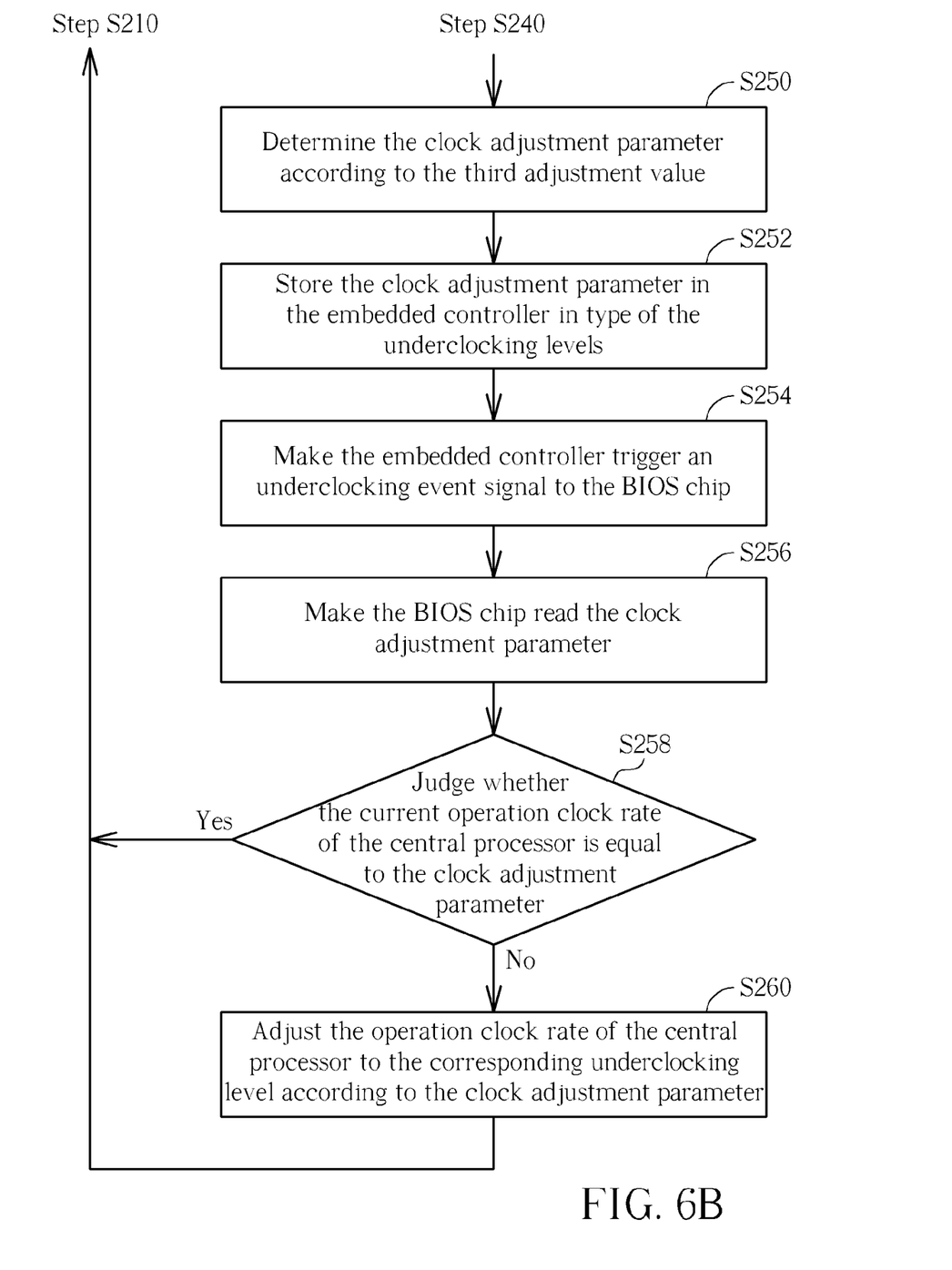

It is added more that in practice, even if the battery discharging method is activated as daemon, it is still allowable for user to determine whether the detection procedures and the following clock adjustment of the battery discharging method are executed. Furthermore, if the current operation clock rate of the central processor 18 matches with the clock adjustment parameter, the operation clock rate of the central processor 18 may be unchanged in practice. The above effects can be realized by setting variables. Please refer to FIG. 6A and FIG. 6B, which are a detailed flow chart of the battery discharging method according to an embodiment. The battery discharging method in FIG. 6A and FIG. 6B is similar in architecture to the battery discharging method in FIG. 3. The following focus on the difference. For other description of the battery discharging method in FIG. 6A and FIG. 6B, please refer to the relative description of the battery discharging method in FIG. 3.

As shown in FIG. 6A and FIG. 6B, after the step S200 and before the steps S220a and S220b, the battery discharging method includes a procedure of reading and judging an activation variable, as shown by the step S205. A user can set the activation variable in another procedure. In the step S205, if the result of the judging is true (i.e. the user allowing activating the battery discharging method), the battery discharging method continues with the following steps S220a and S220b. If the result of the judging is false (i.e. the user denying activating the battery discharging method), the battery discharging method is to delay a period of time, as shown by the step S210. Afterward, the flow is back to the step S200. It is added that in practice, the step S205 can be executed before the step S200 so as to determine whether the execution of the steps S220a and S220b are executed. Even the step S200 is integrated with the step S205; that is, if the residual capacity of the battery is less than a predetermined value, no external power is inputted into the computer system 1, and the activation variable is true, the battery discharging method is to proceed with the steps S220a and S220b.

After the step S250, the battery discharging method is to store the clock adjustment parameter in the embedded controller 14 in type of the underclocking levels, as shown by the step S252. In practice, the clock adjustment parameter can be stored in another memory. Afterward, the battery discharging method is to make the embedded controller 14 trigger an underclocking event signal to the BIOS chip 20, as shown by the step S254. Before the step S260, the battery discharging method is to make the BIOS chip 20 read the clock adjustment parameter, as shown by the step S256. The battery discharging method is then to judge whether the current operation clock rate of the central processor 18 is equal to the clock adjustment parameter (i.e. a stored underclocking level), as shown by the step S258. If the result of the judging in the step S258 is true, it is unnecessary for the battery discharging method to adjust the operation clock rate of the central processor 18, i.e. to maintain the current operation clock rate of the central processor 18. So the battery discharging method is back to the step S210. If the result of the judging in the step S258 is false, the battery discharging method is to execute the step S260, making the BIOS chip 20 adjust the operation clock rate of the central processor 18 to the stored underclocking level according to the clock adjustment parameter.

It is added that in practice, when the battery discharging method is continuously performed, the current operation clock rate of the central processor 18 usually belongs to the previous underclocking level. So the previous underclocking level can be assigned to another variable. In such case, in the step S258, the battery discharging method can compare the two variables with each other directly without detecting the actual operation clock rate of the central processor 18. Furthermore, the storing of the previous underclocking level can be executed in the previous step S260; that is, when an adjustment of the operation clock rate of the central processor 18 occurs, the current underclocking level is stored as the previous underclocking level for the next time. It is added more that in the foregoing description, the adjustment of the operation clock rate of the central processor 18 is performed on a basis of finite levels, but the invention is not limited thereto. In practice, the adjustment of the operation clock rate of the central processor 18 can be based on a continuous adjustment, for example a conversion function, which converts the first detection value and the second detection value to directly obtain the clock adjustment parameter. In such case, the flow charts in FIG. 3, FIG. 6A and FIG. 6B can be simplified further.

As discussed above, the battery discharging method can monitors two statuses of the electronic characteristics of the battery 12 simultaneously, which reflects the actual condition of the battery much than the prior art, so that the battery can be discharged in a proper discharging condition so as to extend the discharging time of the battery and utilize the stored energy in the battery efficiently. Furthermore, in the above embodiments, the battery discharging method monitors only two often-used statuses of the battery, such as residual capacity and discharging current; however, the invention is not limited thereto. For example, discharging temperature, discharging voltage and soon is applicable. Besides, in a practical application, the invention can monitor more statuses of the battery 12 to reflect the actual condition of the battery further. For example, stored energy in a battery is discharged more efficiently only at a proper temperature. The discharging temperature and the discharging current are usually related. In the battery discharging method in the prior art, only the stored energy in the battery not the discharging temperature is under consideration, leading to difficulty in discharging the stored energy in the battery efficiently. In some cases, it is probable that some stored energy is still left, but cannot be discharged, leading to halt to the system and damage to software and hardware. Therefore, the invention can reflect the actual condition of the battery more than the prior art, so that the battery can be discharged in a proper discharging condition so as to extend the discharging time of the battery and utilize the stored energy in the battery efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery discharging method for a computer system, the computer system comprising a processor and a battery for powering the processor, the battery discharging method comprising the following steps:
   (a) detecting a first detection value relative to a first status of the battery and a second detection value relative to a second status of the battery;
   (b-1) determining a first adjustment value according to the first detection value;
   (b-2) determining a second adjustment value according to the second detection value;
   (b-3) adding the first adjustment value and the second adjustment value to be a third adjustment value;
   (b-4) determining a clock adjustment parameter according to the third adjustment value; and
   (c) adjusting an operation clock rate of the processor according to the clock adjustment parameter.

2. The battery discharging method of claim 1, wherein in the step (a), the first status and the second status are two selected from the group consisting of discharging temperature, discharging current, discharging voltage, and residual capacity.

3. The battery discharging method of claim 1, wherein the step (b-1) is performed by the following steps:
   according to a plurality of detection value ranges relative to the first status and a plurality of adjustment reference values corresponding to the detection value ranges, determining one detection value range containing the first detection value; and
   assigning the adjustment reference value corresponding to the determined detection value range to the first adjustment value.

4. The battery discharging method of claim 1, wherein the step (b-3) further comprises the following step:
   if the third adjustment value is larger than a predetermined value, assigning the predetermined value to the third adjustment value.

5. The battery discharging method of claim 1, wherein the step (b-4) is performed by the following steps:
   according to a plurality of adjustment comparison values and a plurality of adjustment reference parameters, determining one adjustment comparison value matching the third adjustment value; and
   assigning the adjustment reference parameter corresponding to the determined adjustment comparison value to the clock adjustment parameter.

6. The battery discharging method of claim 1, wherein the clock adjustment parameter corresponds to one of a plurality of underclocking levels, and the step (c) is performed by the following step:
   adjusting the operation clock rate of the processor to be the corresponding underclocking level.

7. The battery discharging method of claim 1, wherein the computer system comprises an embedded controller and a basic input/output system, the clock adjustment parameter is an underclocking level, and the step (c) is performed by the following steps:
   (c-1) the embedded controller storing the clock adjustment parameter;
   (c-2) the embedded controller triggering an underclocking event signal to the basic input/output system;
   (c-3) the basic input/output system reading the clock adjustment parameter; and
   (c-4) the basic input/output system adjusting the operation clock rate of the processor to the underclocking level according to the clock adjustment parameter.

8. The battery discharging method of claim 7, wherein the step (c-4) is performed by the following steps:
   the basic input/output system judging whether the operation clock rate of the processor is equal to the clock adjustment parameter; and
   if the result of the judging is false, the basic input/output system adjusting the operation clock rate of the processor to the underclocking level according to the clock adjustment parameter.

9. The battery discharging method of claim 8, wherein the step (c-4) further comprises the following step:
   if the result of the judging is true, the basic input/output system maintaining the operation clock rate of the processor.

10. The battery discharging method of claim 1, wherein the step (a) is performed by the following step:
    when a residual capacity of the battery is less than a predetermined value, and no external power is inputted into the computer system, detecting the first detection value relative to the first status of the battery and the second detection value relative to the second status of the battery.

11. The battery discharging method of claim 10, wherein the predetermined value is 50%.

12. The battery discharging method of claim 1, before the step (a), further comprising setting an activation variable, wherein the step (a) is performed by the following step:
    when a residual capacity of the battery is less than a predetermined value, no external power is inputted into the computer system, and the activation variable is true, detecting the first detection value relative to the first status of the battery and the second detection value relative to the second status of the battery.

13. A battery discharging method for a computer system, the computer system comprising a processor, a battery for powering the processor, an embedded controller, and a basic input/output system, the battery discharging method comprising the following steps:

(a) detecting a first detection value relative to a first status of the battery and a second detection value relative to a second status of the battery;
(b) determining a clock adjustment parameter according to the first detection value and the second detection value, the clock adjustment parameter being an underclocking level; and
(c-1) the embedded controller storing the clock adjustment parameter;
(c-2) the embedded controller triggering an underclocking event signal to the basic input/output system;
(c-3) the basic input/output system reading the clock adjustment parameter; and
(c-4) the basic input/output system judging whether an operation clock rate of the processor is equal to the clock adjustment parameter, and if the result of the judging is false, the basic input/output system adjusting the operation clock rate of the processor to the underclocking level according to the clock adjustment parameter.

14. The battery discharging method of claim 13, wherein in the step (a), the first status and the second status are two selected from the group consisting of discharging temperature, discharging current, discharging voltage, and residual capacity.

15. The battery discharging method of claim 13, wherein the step (b) is performed by the following steps:
according to a plurality of detection value ranges relative to the first status and a plurality of adjustment reference values corresponding to the detection value ranges, determining one detection value range containing the first detection value;
assigning the adjustment reference value corresponding to the determined detection value range to the first adjustment value;
determining a second adjustment value according to the second detection value;
adding the first adjustment value and the second adjustment value to be a third adjustment value; and
determining the clock adjustment parameter according to the third adjustment value.

16. The battery discharging method of claim 13, wherein the step (b) further comprises the following step:
determining a first adjustment value according to the first detection value;
determining a second adjustment value according to the second detection value;
adding the first adjustment value and the second adjustment value to be a third adjustment value;
if the third adjustment value is larger than a predetermined value, assigning the predetermined value to the third adjustment value; and
determining the clock adjustment parameter according to the third adjustment value.

17. The battery discharging method of claim 13, wherein the step (b) is performed by the following steps:
determining a first adjustment value according to the first detection value;
determining a second adjustment value according to the second detection value;
adding the first adjustment value and the second adjustment value to be a third adjustment value; and
according to a plurality of adjustment comparison values and a plurality of adjustment reference parameters, determining one adjustment comparison value matching the third adjustment value; and assigning the adjustment reference parameter corresponding to the determined adjustment comparison value to the clock adjustment parameter.

18. The battery discharging method of claim 13, wherein the step (c-4) further comprises the following step:
if the result of the judging is true, the basic input/output system maintaining the operation clock rate of the processor.

19. The battery discharging method of claim 13, wherein the step (a) is performed by the following step:
when a residual capacity of the battery is less than a predetermined value, and no external power is inputted into the computer system, detecting the first detection value relative to the first status of the battery and the second detection value relative to the second status of the battery.

20. The battery discharging method of claim 19, wherein the predetermined value is 50%.

21. The battery discharging method of claim 13, before the step (a), further comprising setting an activation variable, wherein the step (a) is performed by the following step:
when a residual capacity of the battery is less than a predetermined value, no external power is inputted into the computer system, and the activation variable is true, detecting the first detection value relative to the first status of the battery and the second detection value relative to the second status of the battery.

22. A battery discharging method for a computer system, the computer system comprising a processor and a battery for powering the processor, the battery discharging method comprising the following steps:
setting an activation variable;
(a) when a residual capacity of the battery is less than a predetermined value, no external power is inputted into the computer system, and the activation variable is true, detecting a first detection value relative to a first status of the battery and a second detection value relative to a second status of the battery;
(b) determining a clock adjustment parameter according to the first detection value and the second detection value; and
(c) adjusting an operation clock rate of the processor according to the clock adjustment parameter.

23. The battery discharging method of claim 22, wherein in the step (a), the first status and the second status are two selected from the group consisting of discharging temperature, discharging current, discharging voltage, and residual capacity.

24. The battery discharging method of claim 22, wherein the step (b) is performed by the following steps:
according to a plurality of detection value ranges relative to the first status and a plurality of adjustment reference values corresponding to the detection value ranges, determining one detection value range containing the first detection value;
assigning the adjustment reference value corresponding to the determined detection value range to the first adjustment value;
determining a second adjustment value according to the second detection value;
adding the first adjustment value and the second adjustment value to be a third adjustment value; and
determining the clock adjustment parameter according to the third adjustment value.

25. The battery discharging method of claim 22, wherein the step (b) further comprises the following step:

determining a first adjustment value according to the first detection value;

determining a second adjustment value according to the second detection value;

adding the first adjustment value and the second adjustment value to be a third adjustment value;

if the third adjustment value is larger than a predetermined value, assigning the predetermined value to the third adjustment value; and determining the clock adjustment parameter according to the third adjustment value.

26. The battery discharging method of claim 22, wherein the step (b) is performed by the following steps:

determining a first adjustment value according to the first detection value;

determining a second adjustment value according to the second detection value;

adding the first adjustment value and the second adjustment value to be a third adjustment value; and according to a plurality of adjustment comparison values and a plurality of adjustment reference parameters, determining one adjustment comparison value matching the third adjustment value; and assigning the adjustment reference parameter corresponding to the determined adjustment comparison value to the clock adjustment parameter.

27. The battery discharging method of claim 22, wherein the clock adjustment parameter corresponds to one of a plurality of underclocking levels, and the step (c) is performed by the following step:

adjusting the operation clock rate of the processor to be the corresponding underclocking level.

28. The battery discharging method of claim 22, wherein the computer system comprises an embedded controller and a basic input/output system, the clock adjustment parameter is an underclocking level, and the step (c) is performed by the following steps:

(c-1) the embedded controller storing the clock adjustment parameter;

(c-2) the embedded controller triggering an underclocking event signal to the basic input/output system;

(c-3) the basic input/output system reading the clock adjustment parameter; and (c-4) the basic input/output system adjusting the operation clock rate of the processor to the underclocking level according to the clock adjustment parameter.

29. The battery discharging method of claim 28, wherein the step (c-4) is performed by the following steps:

the basic input/output system judging whether the operation clock rate of the processor is equal to the clock adjustment parameter; and if the result of the judging is false, the basic input/output system adjusting the operation clock rate of the processor to the underclocking level according to the clock adjustment parameter; and if the result of the judging is true, the basic input/output system maintaining the operation clock rate of the processor.

30. The battery discharging method of claim 22, wherein the predetermined value is 50%.

* * * * *